(No Model.) 2 Sheets—Sheet 1.

W. A. EDDY.
NEGATIVE SLIDE AND FILM ILLUMINATOR AND CAMERA OBSCURA.

No. 576,435. Patented Feb. 2, 1897.

WITNESSES:
William P. Goebel
C. R. Ferguson

INVENTOR
W. A. Eddy
BY
ATTORNEYS.

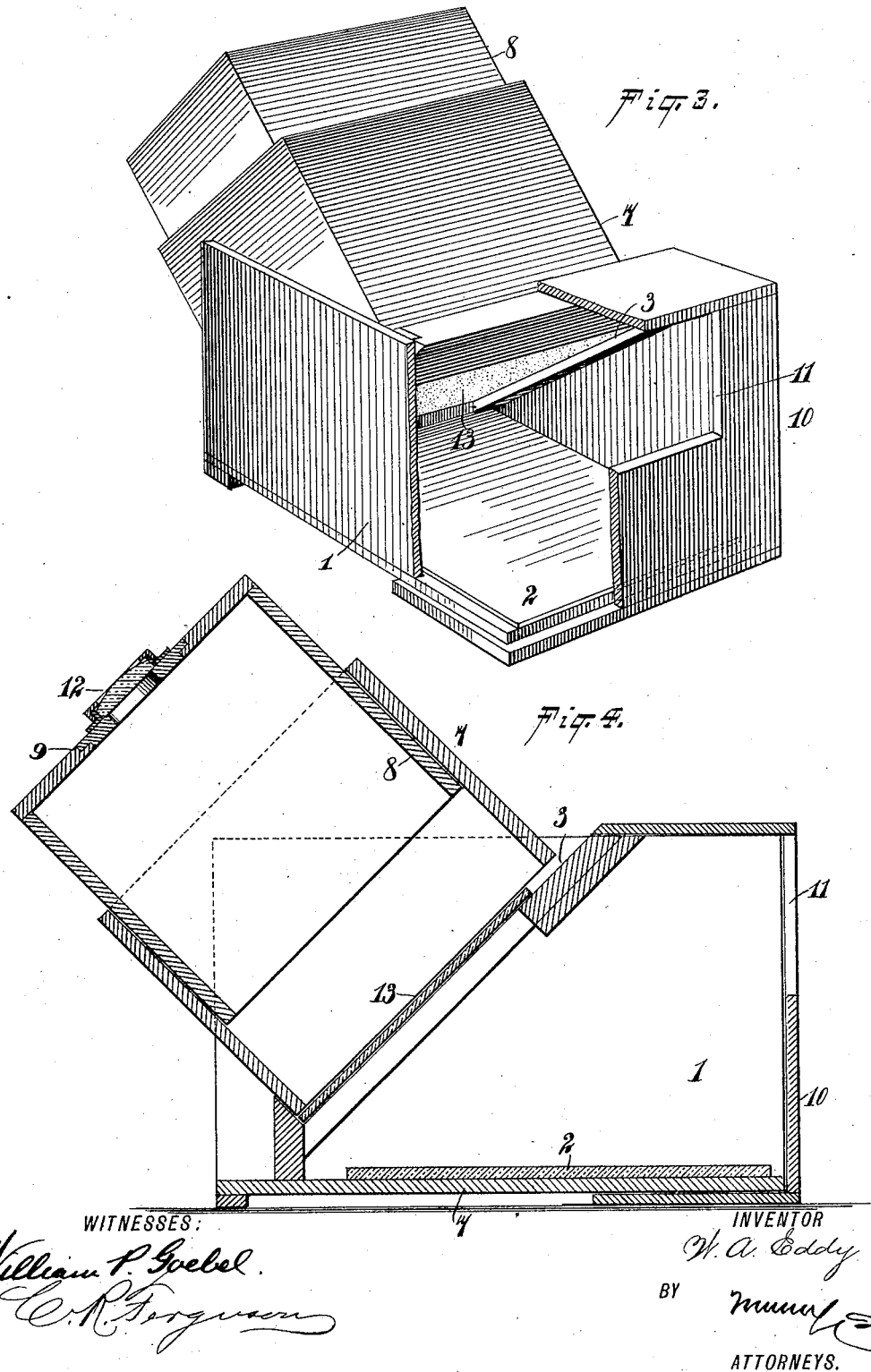

UNITED STATES PATENT OFFICE.

WILLIAM A. EDDY, OF BAYONNE, NEW JERSEY.

NEGATIVE-SLIDE AND FILM-ILLUMINATOR AND CAMERA OBSCURA.

SPECIFICATION forming part of Letters Patent No. 576,435, dated February 2, 1897.

Application filed March 13, 1896. Serial No. 583,092. (No model.)

*To all whom it may concern:*

Be it known that I, WILLIAM A. EDDY, of Bayonne, in the county of Hudson and State of New Jersey, have invented a new and Improved Negative-Slide and Film-Illuminator and Camera Obscura, of which the following is a full, clear, and exact description.

This invention relates, primarily, to devices for the use of photographers in the examination of negatives or for the examination of lantern-slides, and, further, to a device which may be readily changed from such negative-examining device to a camera obscura, the object being to provide means whereby a negative, either dry or in its wet state, may be minutely examined and wherein a reflected light may be thrown upon the negative or slide to highly illuminate it.

I will describe a device embodying my invention and then point out the novel features in the appended claims.

Reference is to be had to the accompanying drawings, forming a part of this specification, in which similar characters of reference indicate corresponding parts in all the views.

Figure 1:
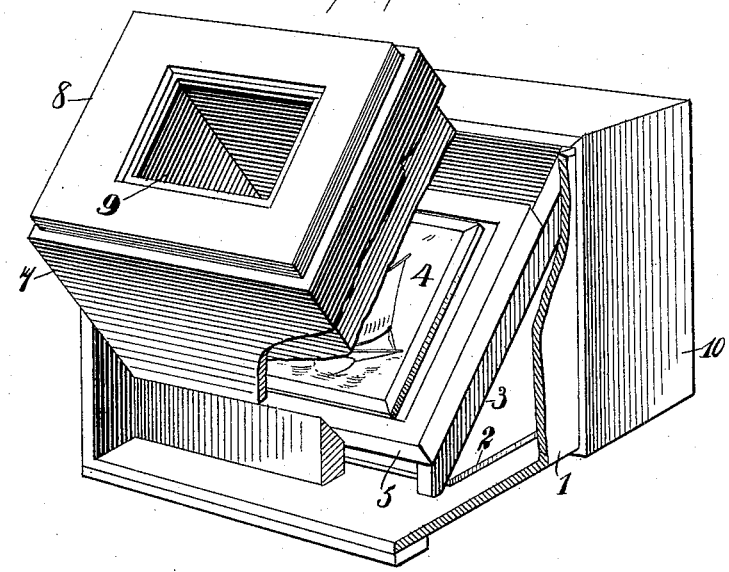
Figure 2:
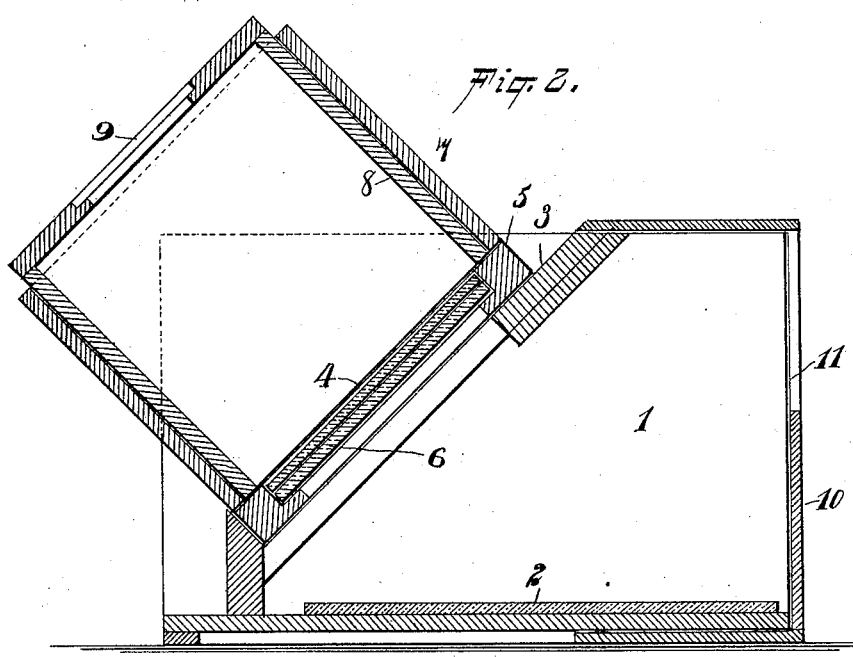

Figure 1 is a perspective view of an illuminator embodying my invention with certain parts broken away to more clearly show other portions. Fig. 2 is a longitudinal vertical section thereof. Fig. 3 is a perspective view showing the device when employed as a camera obscura with certain parts broken away to more clearly show other parts, and Fig. 4 is a longitudinal vertical section thereof.

The device comprises a reflector-box 1, open at its ends and having arranged within it in a horizontal plane a mirror 2, which serves as a reflector. Arranged transversely within the reflector-box 1 and at an acute angle to the plane of the reflector is a support 3, having an opening through it and designed to support a plate, film, or slide 4. I have here shown a plate, film, or slide 4 as supported in a frame 5. This frame is not wholly essential to the operation of the device. In use it may be preferable to place a plate of ground glass 6 underneath the plate, film, or slide.

Removably mounted in one end of the box 1 and designed to rest its open end on the frame 5 or in such other manner as to inclose the plate 4 is a sight-box, here shown as consisting of two telescopic sections 7 8. The inner section 8 is provided at its outer end with a sight-opening 9, so arranged that a lens may be placed therein, if desired. When used as an illuminator, the forward end of the box 1 may be provided with a cover 10, provided with an opening 11 in its upper portion. This cover need only be used, however, when it is desired to reduce the amount of light admitted.

In Figs. 3 and 4 I have shown the parts arranged to serve as a camera obscura. When so used, a small lens 12 will be placed in the sight-opening 9 and a ground glass 13 will be placed on the support 3.

When the device is used as an illuminator, the plate, film, or slide will be placed in position and the open end of the box 1 turned toward the light, either the sunlight or artificial light, and this light by striking the mirror 2 will be reflected upon the plate, film, or slide and highly illuminate it, and a person may examine the same by looking through the opening 9.

When used as a camera obscura, the lens 12 will be turned toward the object which it is desired to have reflected in the mirror, and then by looking through the opening 11 the said object may be clearly discerned in the reflector or mirror 2. Of course the interior walls of the several parts will be blackened to prevent the absorption of light.

In examining negatives the film or sensitive side of the plate should be placed toward the eye and away from the ground glass 6, so that the negative will not be marred in the slightest degree in the examination. It is obvious also that a raised rim may be placed on the support, in which a wet negative may be placed for examination, but when such wet negatives are examined it will be necessary to place a small drainage-tank at a convenient place within the device.

Films of celluloid may be placed between two plates of crystal glass for examination, as these plates of course will hold the film flat, and obviously, when the device is used as a camera obscura, the proper focus may be obtained by moving the section 8 of the sight-box relatively to the section 7.

The apparatus can also be used as a photographic camera for exposing plates or films sensitive to light. In this case a lens is used, as in Fig. 4, and instead of the apertured cover 10 I employ a completely-closed cover, so that no light can reach the back of the sensitive plate.

By adjusting the apertured cover 10 farther in or out the amount of light admitted to the mirror 2 through the opening 11 may be readily regulated.

It will be seen that the article on the support 3 can be illuminated in two ways, either by means of the light reflected from the mirror 2 or by means of the light admitted through the opening 9. In the first case the observer views the article directly through the opening 9; in the second case he sees the reflection of the article in the mirror 2. In either case the amount of light falling upon the article may be regulated by adjusting either the section 8 or the cover 10. The article-support is therefore placed between two light-directing devices.

Having thus described my invention, I claim as new and desire to secure by Letters Patent—

1. The combination of the box having an outwardly-movable rear wall or cover provided with an aperture in its upper portion, an inclined apertured support at the front end of the box, and a mirror located at the bottom of the box and arranged to throw the light entering through the aperture in the rear wall on an article placed on said apertured support, substantially as described.

2. The combination of the box having a rear wall or cover provided with an aperture in its upper portion, an inclined apertured support at the front end of the box, a mirror located at the bottom of the box and arranged to throw the light entering through the aperture in the rear wall on an article placed on said apertured support, a stationary closed section extending upwardly in front of said inclined support, and an outwardly-movable sight-section sliding on said stationary section, substantially as described.

WILLIAM A. EDDY.

Witnesses:
JNO. M. RITTER,
C. R. FERGUSON.